(12) United States Patent
Basham et al.

(10) Patent No.: US 10,976,953 B2
(45) Date of Patent: *Apr. 13, 2021

(54) OPTIMIZED DATA REPLICATION IN MULTI-TIER STORAGE ENVIRONMENT

(71) Applicant: INTERNATIONAL BUSINESS MACHINES CORPORATION, Armonk, NY (US)

(72) Inventors: Robert B. Basham, Beaverton, OR (US); Nilesh Bhosale, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,887

(22) Filed: Jan. 2, 2020

(65) Prior Publication Data
US 2020/0142597 A1    May 7, 2020

Related U.S. Application Data

(63) Continuation of application No. 15/943,932, filed on Apr. 3, 2018, now Pat. No. 10,552,082.

(51) Int. Cl.
*G06F 12/00* (2006.01)
*G06F 3/06* (2006.01)
*H04L 29/08* (2006.01)

(52) U.S. Cl.
CPC ............ *G06F 3/065* (2013.01); *G06F 3/0604* (2013.01); *G06F 3/067* (2013.01); *G06F 3/0619* (2013.01); *H04L 67/1097* (2013.01)

(58) Field of Classification Search
CPC ...... G06F 3/065; G06F 3/0604; G06F 3/0619; G06F 3/067; H04L 67/1097
See application file for complete search history.

(56) References Cited

U.S. PATENT DOCUMENTS 5,018,060 A     5/1991  Gelb
8,909,887 B1 * 12/2014  Armangau ............ G06F 3/0644
                                                711/165

(Continued)

OTHER PUBLICATIONS

IBM: List of IBM Patents or Patent Applications Treated As Related (Appendix P), Jan. 2, 2019, 2 pages.

(Continued)

*Primary Examiner* — Prasith Thammavong
(74) *Attorney, Agent, or Firm* — David Spalding (57) ABSTRACT

The method, computer program product and computer system of the present invention may include a computing device that replicates data from a first data storage site, which may have a plurality of data storage tiers, to one or more second data storage sites. The computing device may identify a portion of the data on a first tier of the first data storage site to be inactive and move the inactive data to a second tier of the first data storage site. The computing device may compute a number of slices to slice the inactive data into and a location to store the slices of inactive data using an information dispersal algorithm. The computing device may send the computed number of slices and storage location for the inactive data to the one or more second data storage sites to apply to the data replicated from the first data storage site.

20 Claims, 7 Drawing Sheets

(56) References Cited

U.S. PATENT DOCUMENTS

| | | | |
|---|---|---|---|
| 9,355,112 B1* | 5/2016 | Armangau | G06F 16/1774 |
| 9,424,275 B2 | 8/2016 | Klimetschek | |
| 9,471,050 B2 | 10/2016 | Tilley | |
| 9,477,738 B2 | 10/2016 | Bourbonnais | |
| 9,513,814 B1 | 12/2016 | Can | |
| 9,619,429 B1 | 4/2017 | Wang | |
| 9,804,656 B2* | 10/2017 | Hurd | G06F 1/3203 |
| 2011/0106862 A1 | 5/2011 | Mamidi | |
| 2011/0289122 A1 | 11/2011 | Grube | |
| 2013/0325823 A1 | 12/2013 | Resch | |
| 2014/0019579 A1 | 1/2014 | Motwani | |
| 2015/0370883 A1* | 12/2015 | Kalki | H04L 63/10 707/600 |
| 2017/0163730 A1* | 6/2017 | Baptist | H04L 67/1004 |
| 2017/0192700 A1* | 7/2017 | Wozniak | G06F 3/064 |
| 2019/0303011 A1 | 10/2019 | Basham | |
| 2020/0242031 A1* | 7/2020 | Dalmatov | G06F 12/0811 |

OTHER PUBLICATIONS

Mell et al., "The NIST Definition of Cloud Computing", Recommendations of the National Institute of Standards and Technology, Special Publication 800-145, Sep. 2011, 7 pages.

Pham, L. M. & Pham, T. M. (2015). Autonomic Fine-Grained Migration and Replication of Component Based Applications Across Multi-Clouds. Second National Foundation for Science and Technology Development Conference on Information and Computer Science. doi: 10.1109/NICS.2015.7302221.

* cited by examiner

OPTIMIZED DATA REPLICATION IN MULTI-TIER STORAGE ENVIRONMENT

BACKGROUND

The present invention relates generally to a method, system, and computer program for multi-tier data storage. More particularly, the present invention relates to a method, system, and computer program for hybrid cloud storage.

Data in the enterprise is growing at an alarming rate led by growth in unstructured data. Thus, enterprises need a multi-site data replication solution that provides a Network Access Server (NAS) interface, as a high performance tier, backed with a cheaper, highly scalable cloud tier. Hybrid cloud storage places inactive data to cloud object storage. This frees up high performance storage capacity which can be used for more active data, thus reducing storage costs. Inactive data constitutes a large proportion of data in the enterprise. Migrating cooler/cold data to lower cost cloud storage tier could result in cost savings.

One such hybrid cloud storage program is IBM® Transparent Cloud Tiering (TCT), which bridges an on-premises high performance NAS tier such as IBM Spectrum Scale and cheaper, scalable multi-site cloud object store tier such as IBM® Cloud Object Store (Cleversafe®). (IBM and CLEVERSAFE are registered trademarks of IBM, Corp.). However, current object storage gateways treat object storage and file storage tiers completely separately. Thus, in multi-site storage systems, data is replicated across the multiple storage sites at the hot data storage tier and then again at the cold data storage tier. This results in data being generally distributed across a Wide Area Network (WAN) by the hot data storage tier, and then over the WAN again when the data cools by the cold storage tier. Therefore, the current state of technology has data that is replicated across sites over a WAN multiple times. This procedure is an inefficient use of resources as data has already been replicated at the file storage tier and thus does not need to be transferred again at the cold storage tier. Further, a WAN is an expensive resource and thus it is optimal to limit usage of a WAN when possible. Thus, a more efficient and cost effective solution for hybrid cloud storage is needed.

BRIEF SUMMARY

One embodiment of the present invention discloses a system for multi-tier data storage. The system may include a first data storage site that may be configured to communicate with a second data storage site over a communications network to replicate data from the first data storage site to the second data storage site. The first data storage site may include a first computer system with one or more processors and a storage medium with a plurality of data storage tiers. The second data storage site may include a second computer system with one or more processors and a second storage medium with a plurality of data storage tiers. The first tier of the first data storage site may be identifiable by the first computer system to include a portion of the data that is inactive. The identification of the inactive portion of the data may be based on a threshold period of time. The second tier of the first data storage site may be configured to receive from the first computer system the portion of the data identified as inactive from the first tier of the first data storage site. The first computer system may be configured to compute a number of slices to slice the portion of data into and identify a location to store the slices of the portion of data using an information dispersal algorithm. The first computer system may be configured to send the computed number of slices of the portion of data and the storage location of the slices of the portion of data to a second tier of the second computer system on the second data storage site over the communications network for updating the data replicated from the first tier of the first data storage site.

Optionally, the first computer system may be configured to slice the portion of the data retrieved from the first tier of the first data storage site according to the information dispersal algorithm and may also be configured to store the sliced portion of the data in the storage locations on the second tier of the first data storage site according to the information dispersal algorithm.

In yet another optional aspect of the inventive system, the first computer system may be configured to read the identified portion of the data on the first tier of the first data storage site and may be configured to contact the second tier of the first data storage site when moving the portion of the data from a first tier of the first data storage tier to a second tier of the first data storage site.

According to one exemplary embodiment of the inventive system, the first computer system may be configured to replicate all the data located on the first data storage site from the first data storage site to the one or more second data storage sites over a communication network.

According to another exemplary embodiment of the inventive system, the computed number of data slices of the portion of data and storage location of the data slices of the portion of data received by the second tier of the first data storage site from the first computer system may be sent to the one or more second data storage sites over a communication network.

According to another exemplary embodiment of the inventive system, the data located on the first data storage site may be divided into a plurality of segments with each segment being replicated, by the one or more processors of the first computer system, to a different second data storage site.

According to another exemplary embodiment of the inventive system, the computed number of data slices of the portion of data and storage location of the data slices of the portion of data received by the second tier of the first data storage site may be divided into a plurality of segments and each segment may be sent to a different second data storage site over a communication network.

An advantage of an embodiment of the present inventive system is that the sliced data is not sent over the network, which would be inefficient and resource consuming. The present invention instead solves this problem by leveraging the replicated data already stored on second data storage sites. Thus, the present inventive system provides a more efficient and cost effective hybrid cloud storage solution where data is only replicated once across a network.

Another embodiment of the present invention discloses a method for multi-tier data storage. The method may include a first computer system with one or more processors which may replicate data from a first tier of a first data storage site to a first tier of a second data storage site, over a communications network. The first data storage site may include a storage medium with a plurality of data storage tiers. The second data storage site may include a second computer system with one or more processors and a second storage medium with a plurality of data storage tiers. The first computer system may identify a portion of the data on a first tier of the first data storage site as being inactive. The portion of the data may be identified as being inactive based on a threshold period of time. The first computer system may move the portion of the data identified as inactive from the first tier of the first data storage site to a second tier of the first data storage site. The first computer system may compute a number of slices to slice the portion of data into and a location to store the slices of the portion of data using an information dispersal algorithm. The first computer system may send the computed number of slices of the portion of data and the storage location of the slices of the portion of data to the second tier of the second computer system on the second data storage site over the communications network for updating the data replicated from the first tier of the first data storage site.

Optionally, the first computer system may slice the portion of the data retrieved from the first tier of the first data storage site according to the information dispersal algorithm and may also store the sliced portion of the data in the storage locations on the second tier of the first data storage site according to the information dispersal algorithm.

In yet another optional aspect of the inventive method, the first computer system may divide the data located on the first data storage site into a plurality of segments. The plurality of segments of the data located on the first data storage site may be replicated to a different second data storage site.

According to one exemplary embodiment of the inventive method the first computer system may send the computed number of data slices of the portion of data and storage location of the data slices of the portion of data received by the second tier of the first data storage site from the first computer system to the one or more second data storage sites over a communication network.

An advantage of an embodiment of the present inventive method is that the sliced data is not sent over the network, which would be inefficient and resource consuming. The present invention instead solves this problem by leveraging the replicated data already stored on second data storage sites. Thus, the present inventive system provides a more efficient and cost effective hybrid cloud storage solution where data is only replicated once across a network.

Another embodiment of the present invention discloses a computer program product for multi-tier data storage. The computer program product may include a first computer system with one or more processors which may replicate data from a first tier of a first data storage site to a first tier of a second data storage site, over a communications network. The first data storage site may include a storage medium with a plurality of data storage tiers. The first computer system may identify a portion of the data on a first tier of the first data storage site as being inactive. The portion of the data may be identified as being inactive based on a threshold period of time. The first computer system may move the portion of the data identified as inactive from the first tier of the first data storage site to a second tier of the first data storage site. The first computer system may compute a number of slices to slice the portion of data into and a location to store the slices of the portion of data using an information dispersal algorithm. The first computer system may send the computed number of slices of the portion of data and the storage location of the slices of the portion of data to the second tier of a second computer system on the second data storage site over the communications network for updating data replicated from the first tier of the first data storage site.

Optionally, the first computer system may slice the portion of the data retrieved from the first tier of the first data storage site according to the information dispersal algorithm and may also store the sliced portion of the data in the storage locations on the second tier of the first data storage site according to the information dispersal algorithm.

In yet another optional aspect of the inventive computer program product, the first computer system may read the identified portion of the data on the first tier of the first data storage site and contact the second tier of the first data storage site when moving the portion of the data from a first tier of the first data storage tier to a second tier of the first data storage site.

According to one exemplary embodiment of the inventive computer program product, the first computer system may replicate all the data located on the first data storage site from the first data storage site to the one or more second data storage sites over a communication network.

According to another exemplary embodiment of the inventive computer program product, the computed number of data slices of the portion of data and storage location of the data slices of the portion of data received by the second tier of the first data storage site from the first computer system may be sent to the one or more second data storage sites over a communication network.

According to another exemplary embodiment of the inventive computer program product, the first computer system may divide the data located on the first data storage site into a plurality of segments. The plurality of segments of the data located on the first data storage site may be replicated to a different second data storage site.

According to one exemplary embodiment of the inventive computer program product, the first computer system may send the computed number of data slices of the portion of data and storage location of the data slices of the portion of data received by the second tier of the first data storage site from the first computer system to the one or more second data storage sites over a communication network.

An advantage of an embodiment of the present inventive computer program product is that the sliced data is not sent over the network, which would be inefficient and resource consuming. The present invention instead solves this problem by leveraging the replicated data already stored on second data storage sites. Thus, the present inventive system provides a more efficient and cost effective hybrid cloud storage solution where data is only replicated once across a network.

BRIEF DESCRIPTION OF THE DRAWINGS

The present invention together may best be understood in conjunction with the drawings, as described below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
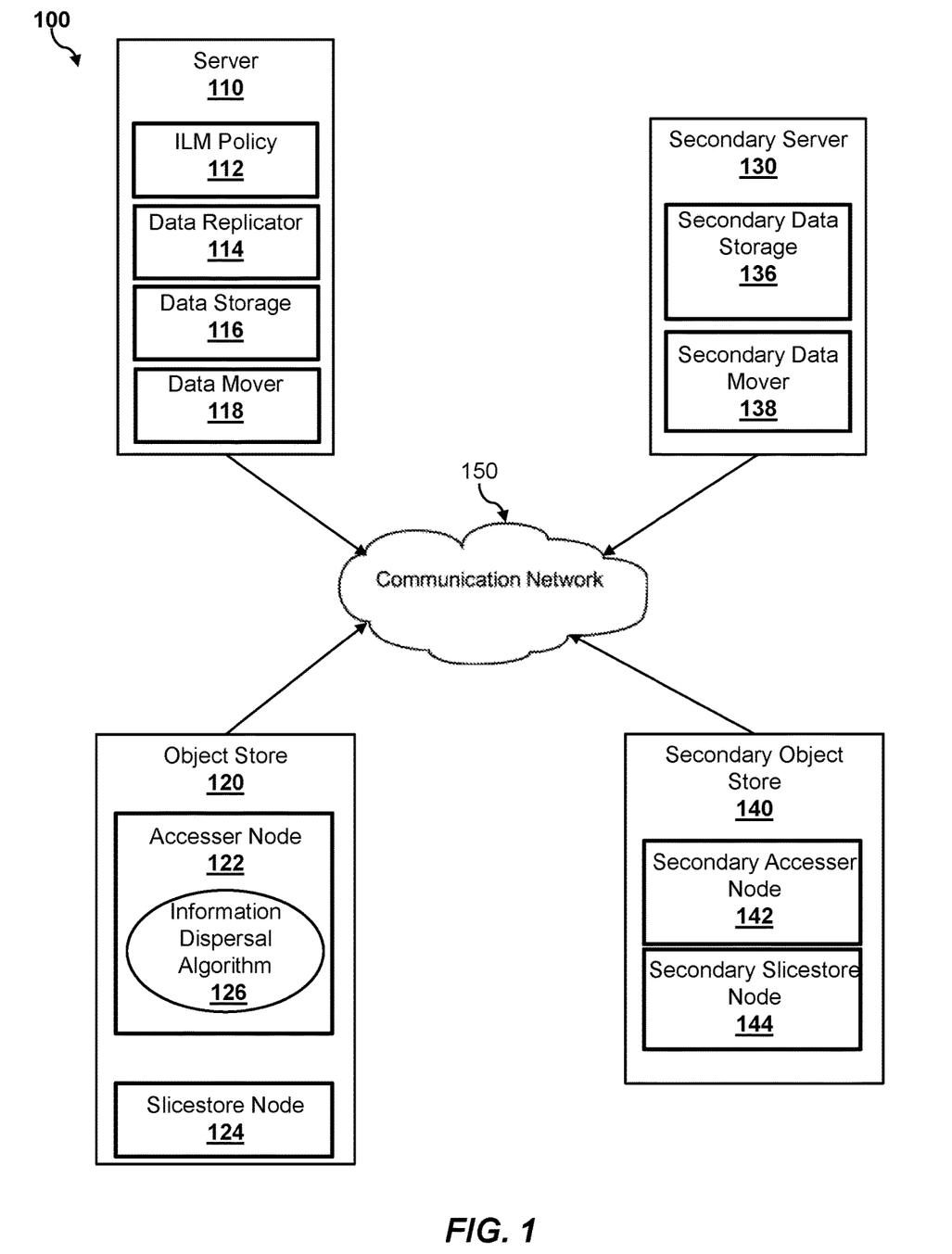
FIG. 1 is a block diagram which illustrates a system for multi-tier, hybrid cloud data storage, in accordance with an embodiment of the invention.

FIG. 1 illustrates a multi-tier, hybrid cloud data storage system 100, in accordance with an embodiment of the invention. In an example embodiment, multi-tier, hybrid cloud data storage system 100 includes object server 110, object store 120, secondary server 130, and secondary object store 140 interconnected via network 150.

In the example embodiment, network 150 is the Internet, representing a worldwide collection of networks and gateways to support communications between devices connected to the Internet. Network 150 may include, for example, wired, wireless or fiber optic connections. In other embodiments, network 150 may be implemented as an intranet, a local area network (LAN), or a wide area network (WAN). In general, network 150 can be any combination of connections and protocols that will support communications between server 110, object store 120, secondary server 130, and secondary object store 140.

Server 110 may contain Information Life Management (ILM) policy 112, data replicator 114, data storage 116, and data mover 118. Server 110 may be a desktop computer, a notebook, a laptop computer, a tablet computer, a handheld device, a smart-phone, a thin client, or any other electronic device or computing system capable of storing data and receiving and sending that data to and from other computing devices such as object store 120, secondary server 130, and secondary object store 140 via network 150. For example, server 110 may be a high-performance Network Access Server (NAS) such as, but not limited to IBM® Spectrum Scale. (IBM is a registered trademark of IBM, Corp.). In some embodiments, server 110 may include a collection of devices, or data sources.

Information Life Management (ILM) policy 112 the data storage and information policy that drives data management in multi-tier, hybrid cloud data storage system 100. ILM policy 112 is a set of rules that determines the most appropriate storage infrastructure, i.e. server vs. cloud, for the data being stored on multi-tier, hybrid cloud data storage system 100. For example, ILM policy 112 may be, but is not limited to, Spectrum Scale policy, which quickly identifies files, i.e. data, based on their attributes and manages them automatically via rules. The rules of Spectrum Scale policy may include, for example, file placement, migration, listing, compression, encryption, and deletion.

Figure 2:
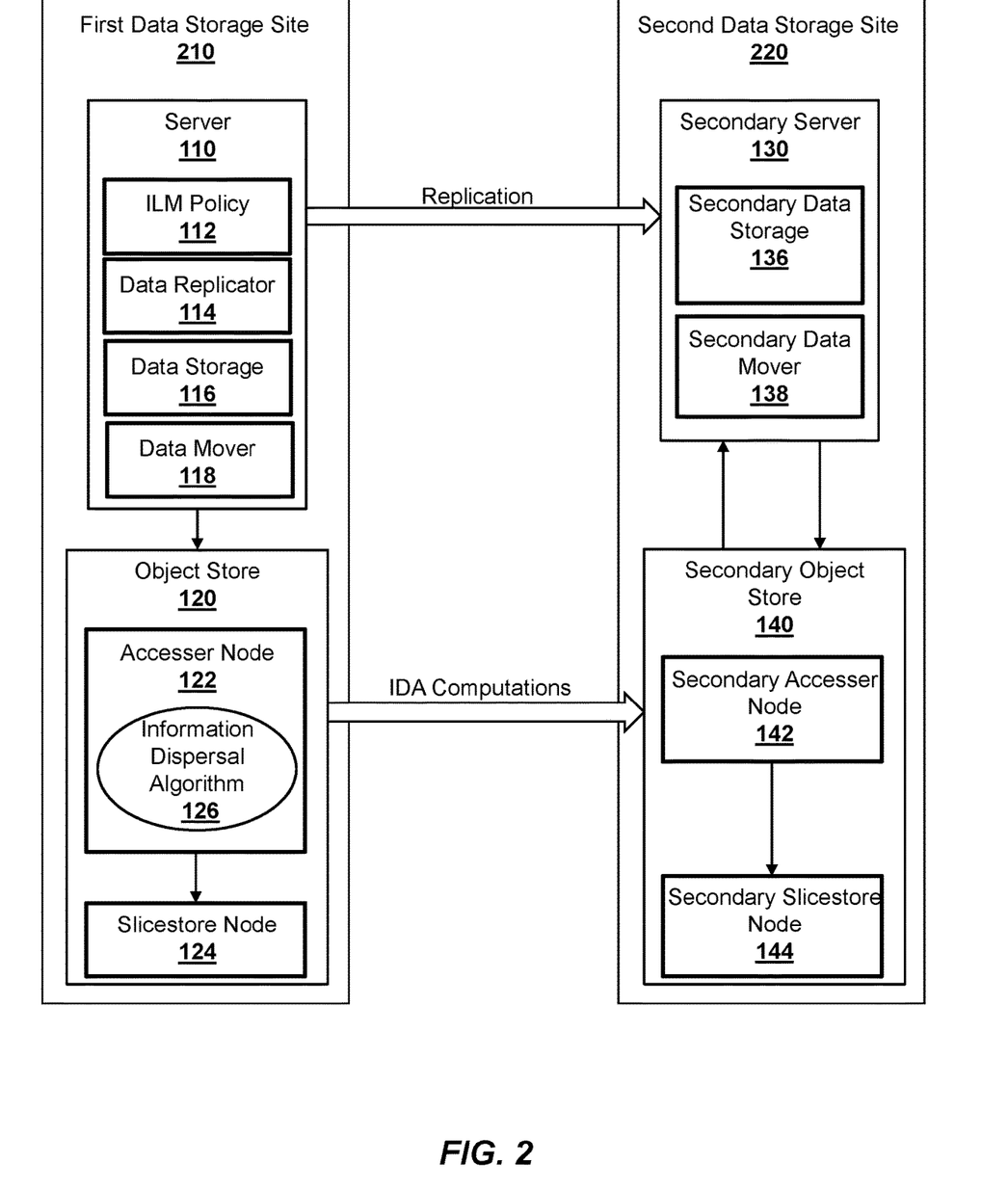
FIG. 2 is a functional block diagram which illustrates an embodiment of multi-tier, hybrid cloud data storage system, in accordance with an embodiment of the invention.

Data replicator 114 may be any data replication technology capable of replicating data stored on one server, such as server 110, to another server, such as secondary server 130 via network 150. It can be appreciated that data replicator 114 may replicate data stored on one server to multiple secondary servers, which can be collectively embodied as secondary server 130. Further, it can be appreciated that the one or more secondary servers may be located at one or more data sites, collectively embodied as second data storage site 220. Data replicator 114 may be a file management system, for example, a parallel filing system, such as, but not limited to, IBM® Spectrum Scale's Active File Management (AFM), which is a scalable, high-performance, file system caching layer. (IBM is a registered trademark of IBM, Corp.).

Data storage 116 may be any computer-readable storage media, such as, but not limited to, random access memory (RAM), and cache memory. In general, data storage 116 can include any suitable volatile or non-volatile computer-readable storage media.

Data mover 118 may be any software capable of moving data to and from any electronic device or computing system. Data mover 118 may be, for example, data migration software, such as, but not limited to, IBM® Transparent Cloud Tiering (TCT), which enables usage of cloud object storage as a secure, reliable, and transparent storage tier. (IBM is a registered trademark of IBM, Corp.). Data mover 118 may leverage ILM policy 112 which would allow a user to define policies for tiering data to a cloud object storage. For example, data mover 118 may have a policy that states any data stored on data storage 116 of object server 110 that has not been accessed for more than a threshold period of time, e.g. one month, should be moved to object store 120. Data mover 118 is described in more detail with reference to FIGS. 2-3. For example, ILM policy 112 may have a rule that states any data stored on data storage 116 of sever 110 that has not been accessed for more than a threshold period of time, e.g. one month, should be moved to cloud storage.

Object store 120 may contain accesser node 122 and slicestore node 124. Object store 120 may be any cloud object store capable of storing data and receiving and sending that data to and from other computing devices such as object server 110, secondary server 130, and secondary object store 140. Object store 120 may be, for example, a cloud object store such as, but not limited to, IBM® Cloud Object Store (ICOS, a.k.a Cleversafe®). (IBM and CLEVERSAFE are registered trademarks of IBM, Corp). Object store 120 is described in more detail with reference to FIGS. 5-6.

Accesser node 122 may contain Information Dispersal Algorithm (IDA) 126. Accesser node 122 may be any computing device, such as, but not limited to, a server or virtual machine, or any other electronic device or computing system capable of receiving, transforming, and sending data to and from other computing devices such as server 110, object store 120, slicestore node 124, secondary server 130, secondary object store 140, and secondary accesser node 142 via data mover 118 or network 150. Accesser node 122 may include Information Dispersal Algorithm (IDA) 126. IDA 126 is resident on accesser node 122 and computes how many slices the data received by accesser node 122 will be made into and how those slices will be distributed across slicestore node 124. Accesser node 122 and IDA 126 are described in more detail with reference to FIGS. 2-3.

Slicestore node 124 may be any computing device, such as, but not limited to, a server or virtual machine, or any other electronic device or computing system capable of receiving data from other computing devices such as accesser node 122 or secondary accesser node 142 via network 150 and storing that data. While only a single slicestore node 124 is illustrated, it can be appreciated that object store 120 may include multiple slicestore nodes. Slicestore node 124 is described in more detail with reference to FIGS. 2-3.

Secondary server 130 may contain secondary data storage 136 and secondary data mover 138. Secondary server 130 may be a desktop computer, a notebook, a laptop computer, a tablet computer, a handheld device, a smart-phone, a thin client, or any other electronic device or computing system capable of storing data and receiving and sending that data to and from other computing devices such as server 110 and secondary object store 140 via network 150. Secondary server 130 may be a high-performance Network Access Server (NAS) such as, but not limited to, IBM® Spectrum Scale. (IBM is a registered trademark of IBM, Corp.). Secondary server 130 is located at a second site separate and apart from server 110. In some embodiments, secondary server 130 may include a collection of devices, or data sources. In an embodiment of the invention, hybrid cloud data storage system 100 may include multiple secondary servers across multiple sites. Secondary data storage 136 and secondary data mover 138 are the same as data storage 116 and data mover 118, respectively. While only a single secondary data storage 136 and secondary data mover 138 are illustrated, it can be appreciated that multi-tier, hybrid cloud data storage system 100 may include multiple secondary data storage and data movers across multiple sites.

Secondary object store 140 may contain secondary accesser node 142 and secondary slicestore node 144. Secondary object store 140 may be any cloud object store capable of storing data and receiving and sending that data to and from other computing devices such as secondary server 130 and object store 120. Object store 120 may be, for example, a cloud object store, such as, but not limited to, IBM® Cloud Object Store (ICOS, a.k.a Cleversafe®). (IBM and CLEVERSAFE are registered trademarks of IBM, Corp). Secondary server 130 is located at a second site separate and apart from server 110 and object store 120. Secondary accesser node 142 is similar to accesser node 122 but lacks IDA 126. Secondary slicestore node 144 is the same as slicestore node 124. While only a single secondary accesser node 142 and secondary slicestore node 144 are illustrated, it can be appreciated that multi-tier, hybrid cloud data storage system 100 may include multiple secondary accesser nodes and slicestore nodes across multiple sites.

Figure 3:
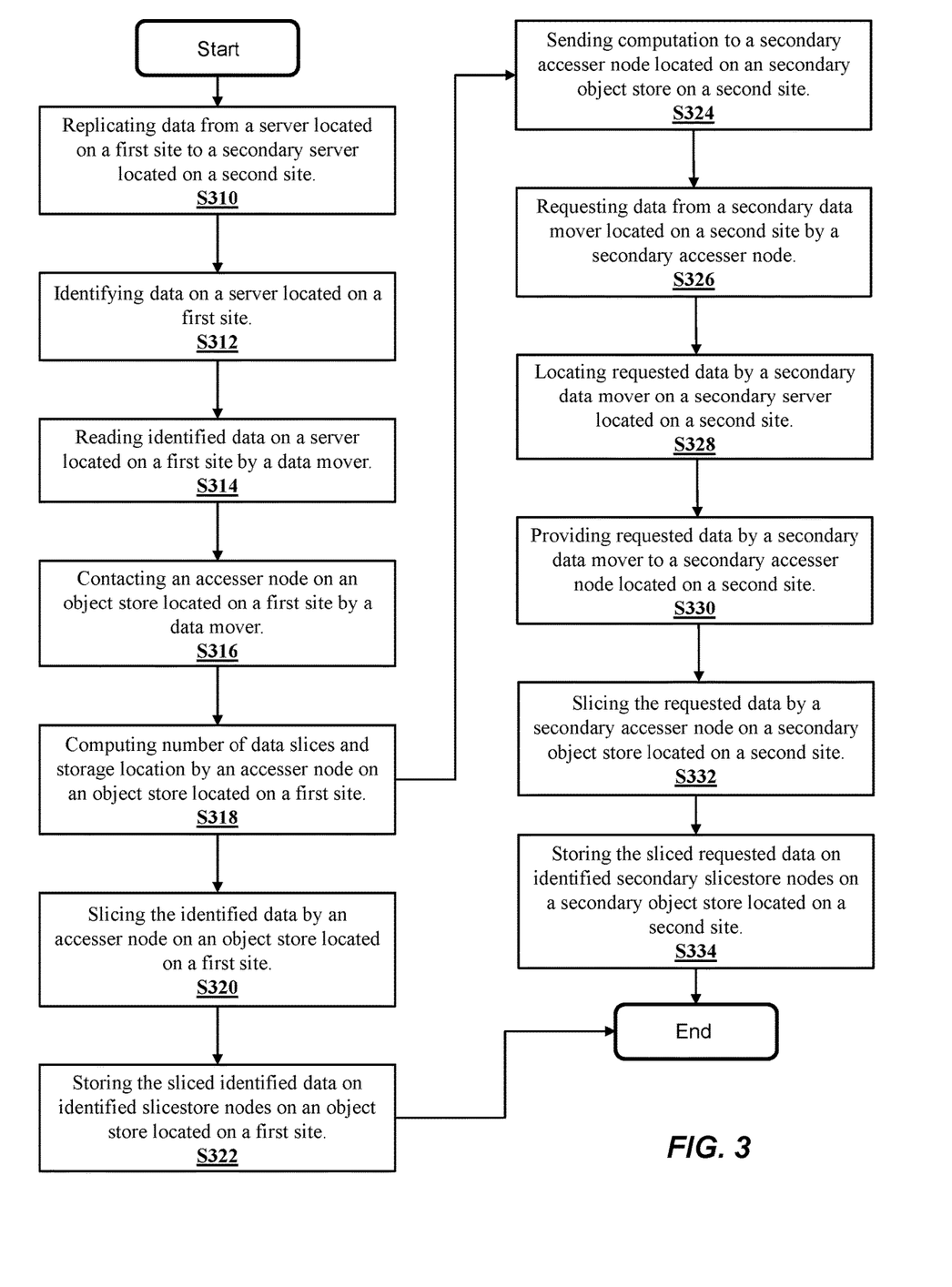
FIG. 3 is a flowchart illustrating an example method of multi-tier, hybrid cloud data storage, in accordance with an embodiment of the invention.

Referring to FIG. 3, a method for of multi-tier, hybrid cloud data storage according to an embodiment of the present invention is described, with reference to the block diagram in FIG. 2.

Referring to step S310, data replicator 114 on server 110 replicates the data on server 110 on a first data storage site 210 to secondary server 130 located on second data storage site 220 over network 150. Data replicator 114 may be configured to replicate the data using, for example, synchronous or asynchronous methods. Synchronous replication is the method whereby data is replicated across sites in real-time as the data is updated. Asynchronous replication is the method whereby data is replicated across sites at regular intervals or upon a user's command.

Referring to step S312, server 110 identifies data located in data storage 116 as being inactive, i.e. cold, based on ILM policy 112. For example, ILM policy 112 may have a rule that states any data stored on data storage 116 of sever 110 that has not been accessed for more than a threshold period of time, e.g. one month, should be moved to cloud storage.

Referring to step S314, data mover 118 reads the identified inactive data on server 110 and moves the identified inactive data to object store 120 at step S316 by contacting accesser node 122. Data mover 118 may move the inactive data using a file transfer protocol, such as, but not limited to, a PUT operation.

Referring to step S318, accesser node 122 computes how many slices the identified inactive data will be made into and how those slices will be stored using IDA 126. For example, IDA 126 may determine that the identified inactive data should be split into x slices and stored across y slicestore nodes embodied as slicestore node 124. Following S318, multi-tier, hybrid cloud data storage system 100 may proceed to steps S320 and S324 simultaneously. However, it can be appreciated that, while not illustrated, steps S324-S334 may also follow step S322.

Referring to step S320, the identified inactive data is sliced and sent to slicestore node 124 according the computations by IDA 126 and stored on slicestore node 124 at step S322.

Referring to step S324, accesser node 122 sends the information dispersal computations made by IDA 126 to secondary accesser node 142 on secondary object store 140 located at second data storage site 220 via network 150. In one embodiment, accesser node 122 may send the information dispersal computations for all the identified inactive data to a single secondary accesser node 142. This contrasts with current technologies where the sliced data from step S520 would also be sent over network 150, which is inefficient and resource consuming. The present invention instead leverages the replicated data already stored on second data storage site 220. Thereby, the present invention does not require that the data be resent across the network twice, that is, once when the data is replicated and again after the data has been moved to the cold storage tier. Instead, the present invention sends data storage computations to the second data storage site 220, which in turn uses the data that was already replicated from the first data storage site 210 at the first tier. Thus, the present invention provides greater efficiency in eliminating the need to send the same data over a network multiple times.

Referring to step S326, secondary accesser node 142 requests the data corresponding to the information dispersal computations received from accesser node 122 from secondary data mover 138.

Referring to step S328, secondary data mover 138 locates the requested data on secondary server 130 and moves the identified data to secondary object store 140 at step S330 by contacting secondary accesser node 142. Secondary data mover 138 may move the data using a PUT operation.

Referring to step S332, the data is sliced and sent to secondary slicestore node 144 according the computations by IDA 126 and stored on secondary slicestore node 144 at step S334. The secondary slicestore node 144 is representative of additional slicestore nodes and thus represents more than one secondary slicestore nodes.

Figure 4:
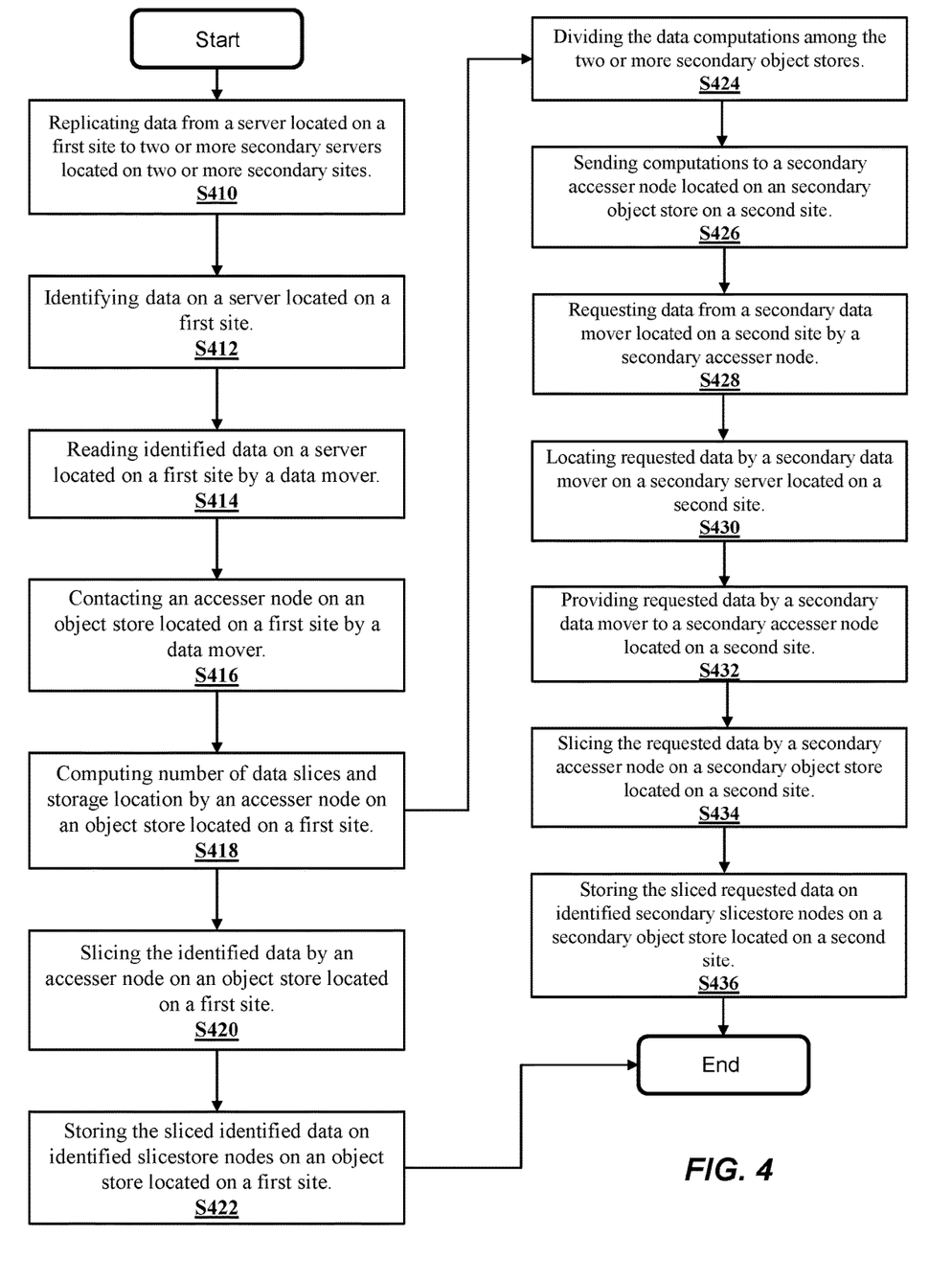
FIG. 4 is a flowchart illustrating an example method of multi-tier, hybrid cloud data storage, in accordance with an embodiment of the invention.

Referring to FIG. 4, another embodiment of multi-tier, hybrid cloud data storage system 100 is depicted. The embodiment of FIG. 4 is substantially similar to that of FIG. 3, with steps S412-S422 and S426-S436 being identical to steps S312-S322 and S324-S334, respectively. FIG. 4 may be understood with reference to FIG. 2.

Referring to step S410, data replicator 114 on server 110 replicates the data on server 110 on a first data storage site 210 to two or more different secondary servers, embodied as secondary server 130 located on two or more different second date storage sites, embodied as second data storage site 220 over network 150. Data replicator 114 may be configured to replicate the data using, for example, synchronous or asynchronous methods. In one embodiment of the invention, data replicator 114 may replicate all the data from sever 110 to two or more different secondary servers, embodied as secondary server 130. In another embodiment of the invention, data replicator 114 may replicate different portions of the data on server 110 to different secondary servers, embodied as secondary server 130. For example, data replicator 114 may replicate half of the data on server 110 to a first secondary server, embodied as secondary server 130 on a first second data storage site, embodied as second data storage site 220 and the second half of the data on server 110 to a different secondary server, embodied as secondary server 130 on a different second storage site, embodied as second data storage site 220.

As stated above, steps S412-S422 are identical to steps S312-S322 as described above with reference to FIG. 3.

Referring to step S424, accesser node 122 may divide the information dispersal computations and send different portions of the information dispersal computations to one or more secondary accesser nodes, embodied as secondary accesser node 142. The division of the information dispersal computations may match the way the data was divided at step S410 among different secondary servers, represented by secondary server 130 on different second data storage sites, represented by second data storage site 220. For example, the information dispersal computations for half of the identified inactive data may be sent to a first secondary accesser node, represented by secondary accesser node 142 on a first second data storage site, represented by second data storage site 220 and the second half of the information dispersal computations for the identified inactive data may be sent to a different secondary accesser node, represented by secondary accesser node 142 on a different second data storage site, represented by second data storage site 220. In another embodiment, the information dispersal computations may not match the way the data was divided at step S510. For example, at the S510, the data may be completely replicated to multiple second data storage sites, represented by second data storage site 220, but the information dispersal computations may still be divided and sent to different second data storage sites, represented by second data storage site 220. In all embodiment of the present invention, the data itself is not being sent to the second data storage site 220 by accesser node 122, only the information dispersal computations are sent over network 150. This contrasts with current technologies where the sliced data from step S520 would also be sent over network 150, which is inefficient and resource consuming. The present invention instead leverages the replicated data already stored on second data storage site 220.

As stated above, steps S426-S436 are identical to steps S324-S334 as described above with reference to FIG. 3.

Figure 5:
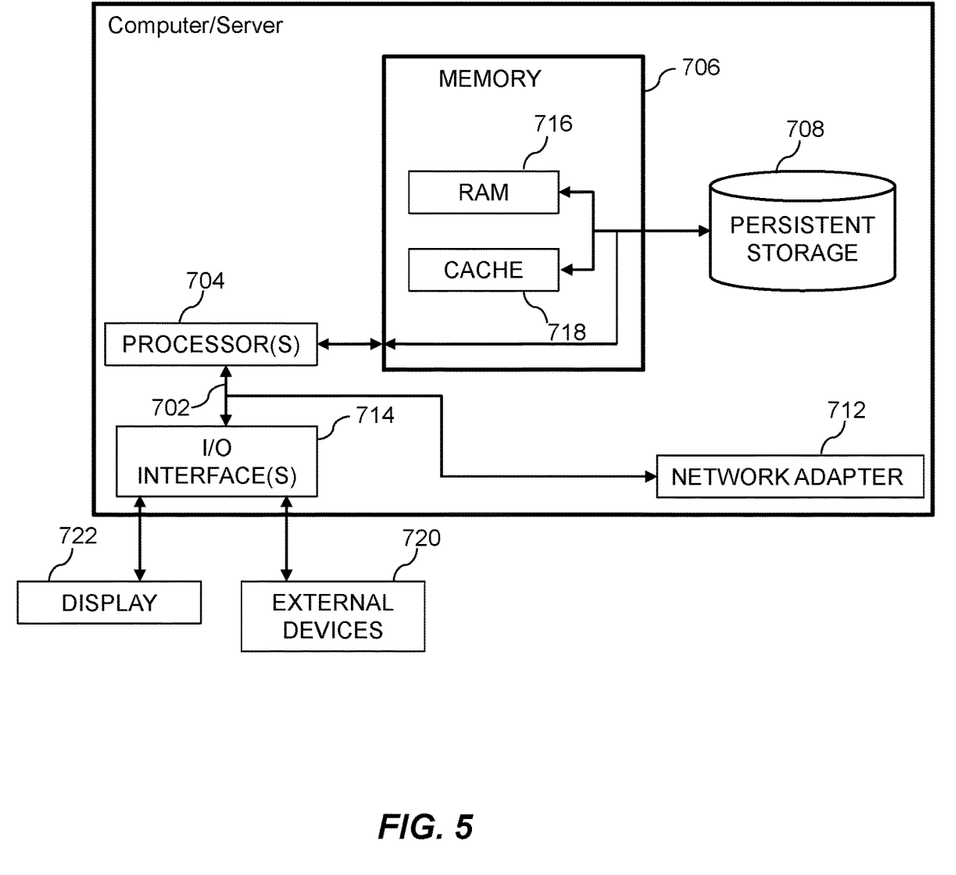
FIG. 5 is a block diagram depicting the hardware components of the multi-tier, hybrid cloud data storage system of FIG. 1, in accordance with an embodiment of the invention.

Referring to FIG. 5, a block diagram of components of server 110, object store 120, secondary server 130, and secondary object store 140 is depicted, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 110, object store 120, secondary server 130, and secondary object store 140 may include communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

The programs ILM policy 112, data replicator 114, data storage 116, and data mover 118 in server 110; accesser node 122, IDA 126, and slicestore node 124 in object store 120; secondary data storage 136 and secondary data mover 138 in secondary server 130; and secondary accesser node 142 and secondary slicestore node 144 in secondary object store 140 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. The programs ILM policy 112, data replicator 114, data storage 116, and data mover 118 in server 110; accesser node 122, IDA 126, and slicestore node 124 in object store 120; secondary data storage 136 and secondary data mover 138 in secondary server 130; and secondary accesser node 142 and secondary slicestore node 144 in secondary object store 140 may be downloaded to persistent storage 708 through communications unit 712.

I/O interface(s) 714 allows for input and output of data with other devices that may be connected to server 110, object store 120, secondary server 130, and secondary object store 140. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention, e.g., The programs ILM policy 112, data replicator 114, data storage 116, and data mover 118 in server 110; accesser node 122, IDA 126, and slicestore node 124 in object store 120; secondary data storage 136 and secondary data mover 138 in secondary server 130; and secondary accesser node 142 and secondary slicestore node 144 in secondary object store 140, can be stored on such portable computer-readable storage media and can be loaded onto persistent storage 708 via I/O interface(s) 714. I/O interface(s) 714 can also connect to a display 722.

Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
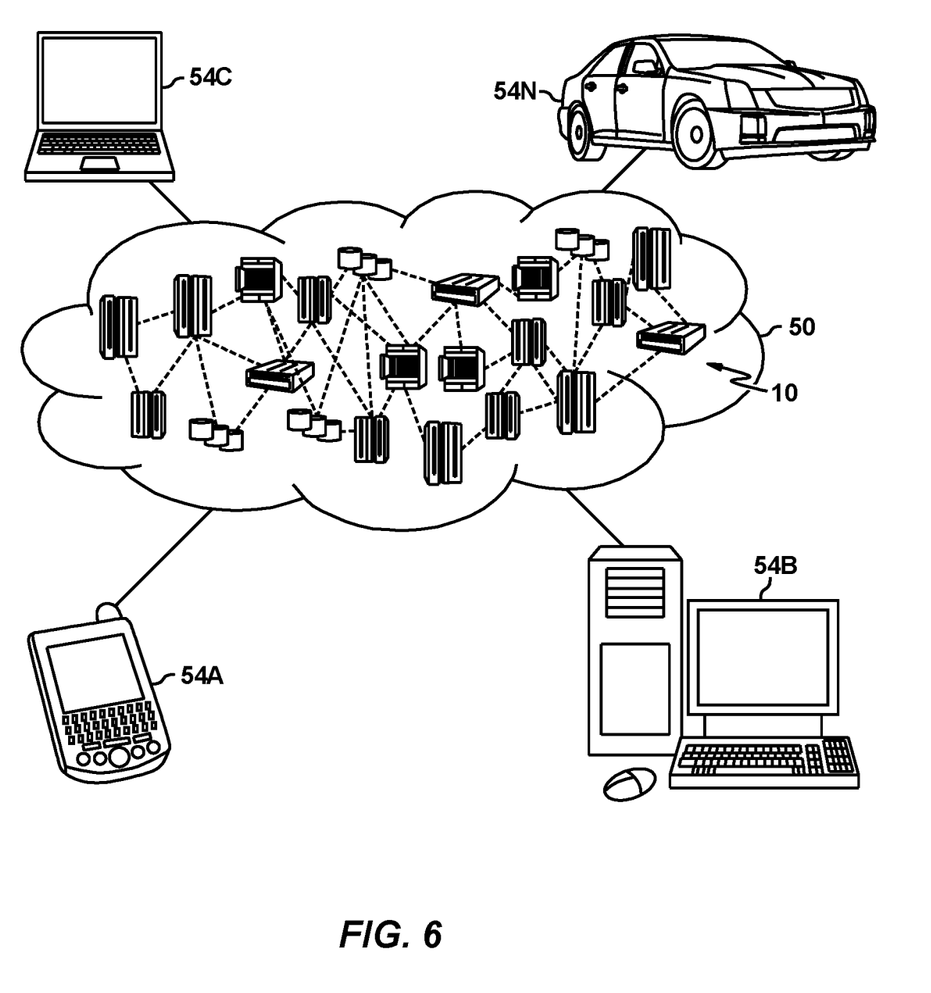
FIG. 6 illustrates a cloud computing environment, in accordance with an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 7:
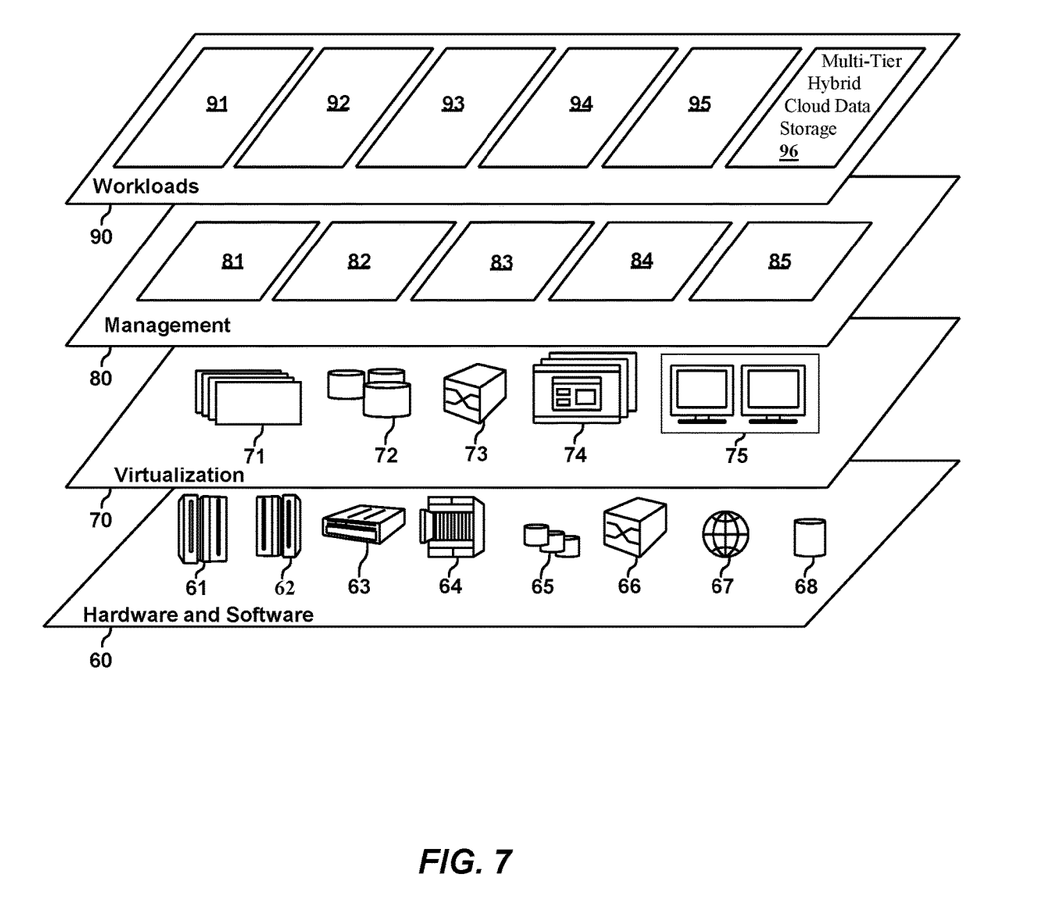
FIG. 7 illustrates a set of functional abstraction layers provided by the cloud computing environment of FIG. 6, in accordance with an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-tier, hybrid cloud data storage 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A system for multi-tier data storage, the system comprising:
    a first data storage site, being configured to communicate with a second data storage site over a communications network, for replicating data from the first data storage site to the second data storage site, the first data storage site and the second data storage site having a plurality of storage tiers;
    a first tier of the first data storage site, being identifiable as including a portion of the data that is inactive, wherein the identification of the portion of the data as being inactive is based on a threshold period of time;
    a second tier of the first data storage site being configured to receive the portion of the data identified as inactive from the first tier of the first data storage site;
    the first data storage site being configured to compute a number of slices to slice the portion of data identified as inactive;
    the first data storage site being configured to identify a location to store the slices of the portion of data identified as inactive using an information dispersal algorithm; and
    the first data storage site being configured to send the computed number of slices of the portion of data identified as inactive and the storage location of the slices of the portion of data identified as inactive from the first data storage site to a second tier of the second data storage site over the communications network for updating data replicated from the first tier of the first data storage site.

2. The computer system of claim 1, wherein the data is replicated from the first data storage site to the second data storage site in real time as the data is updated.

3. The computer system of claim 1, wherein the data is replicated from the first data storage site to the second data storage site at regular intervals.

4. The computer system of claim 1, wherein the data is replicated from the first data storage site to the second data storage site based on a user's command input.

5. The computer system of claim 1, wherein the first data storage site is configured to replicate one or more portions of the data located on the first data storage site, from the first data storage site to the one or more different second data storage sites over a communication network.

6. The computer system of claim 1, wherein the first data storage site is configured to divide into a plurality of segments the computed number of data slices of the portion of data identified as inactive and the storage location of the data slices of the portion of data identified as inactive; and wherein the first data storage site is configured to send each segment to a different second data storage site over the communications network.

7. A computer program product for multi-tier data storage, the computer program product comprising:
a computer-readable storage medium having program instructions embodied therewith, wherein the computer readable storage medium is not a transitory signal per se, the program instructions executable by a computer to cause the computer to perform a method, comprising:
replicating data from a first tier of a first data storage site to a first tier of a second data storage site, the first data storage site and the second data storage site having a plurality of data storage tiers;
identifying a portion of the data on a first tier of the first data storage site as being inactive, wherein the identifying of the portion of the data being inactive is based on a threshold period of time;
moving the portion of the data identified as inactive from the first tier of the first data storage site to a second tier of the first data storage site;
computing a number of slices to slice the portion of data into and a location to store the slices of the portion of data using an information dispersal algorithm; and
sending the computed number of slices of the portion of data and the storage location of the slices of the portion of data to a second tier of a second data storage site for updating the data replicated from the first tier of the first data storage site.

8. The computer program product of claim 7, wherein the data is replicated from the first data storage site to the second data storage site in real time as the data is updated.

9. The computer program product of claim 7, wherein the data is replicated from the first data storage site to the second data storage site at regular intervals.

10. The computer program product of claim 7, wherein the data is replicated from the first data storage site to the second data storage site based on a user's command input.

11. The computer program product of claim 7, wherein replicating data from a first tier of a first data storage site to a first tier of a second data storage site further comprises:
replicating one or more portions of the data located on the first data storage site from the first data storage site to the one or more different second data storage sites over a communication network.

12. The computer program product of claim 7, further comprising:
dividing the computed number of data slices of the portion of data identified as inactive and storage location of the data slices of the portion of data identified as inactive moved to the second tier of the first data storage site into a plurality of segments; and
sending each segment to a different second data storage site over a communication network.

13. A method for multi-tier data storage, the method comprising:
replicating data from a first tier of a first data storage site to a first tier of a second data storage site, the first data storage site and the second data storage site having a plurality of data storage tiers;
identifying a portion of the data on a first tier of the first data storage site as being inactive, wherein the identifying of the portion of the data being inactive is based on a threshold period of time;
moving the portion of the data identified as inactive from the first tier of the first data storage site to a second tier of the first data storage site;
computing a number of slices to slice the portion of data into and a location to store the slices of the portion of data using an information dispersal algorithm; and
sending the computed number of slices of the portion of data and the storage location of the slices of the portion of data to a second tier of a second data storage site for updating the data replicated from the first tier of the first data storage site.

14. The method of claim 13, wherein the data is replicated from the first data storage site to the second data storage site in real time as the data is updated.

15. The method of claim 13, wherein the data is replicated from the first data storage site to the second data storage site at regular intervals.

16. The method of claim 13, wherein the data is replicated from the first data storage site to the second data storage site based on a user's command input.

17. The method of claim 13, wherein replicating data from a first tier of a first data storage site to a first tier of a second data storage site further comprises:
replicating one or more portions of the data located on the first data storage site from the first data storage site to the one or more different second data storage sites over a communication network.

18. The method of claim 13, further comprising:
dividing the computed number of data slices of the portion of data identified as inactive and storage location of the data slices of the portion of data identified as inactive moved to the second tier of the first data storage site into a plurality of segments; and
sending each segment to a different second data storage site over a communication network.

19. The method of claim 13, wherein the threshold period of time for the portion of data identified by the first data storage site as being inactive is based on when the data was last accessed.

20. The method of claim 13, wherein moving the portion of the data identified as inactive from the first tier of the first data storage site to a second tier of the first data storage site further comprises:
reading the identified portion of the data on the first tier of the first data storage site; and contacting the second tier of the first data storage site.

* * * * *